United States Patent
Bai et al.

(10) Patent No.: US 10,276,208 B1
(45) Date of Patent: Apr. 30, 2019

(54) DATA STORAGE DEVICE CODING OUT AMBIGUITY IN THREE-DIMENSIONAL MAGNETIC RECORDING

(71) Applicant: Western Digital Technologies, Inc., San Jose, CA (US)

(72) Inventors: Zhigang Bai, Fremont, CA (US); Yaguang Wei, Pleasanton, CA (US); Terence Tin Lok Lam, Cupertino, CA (US); Kuok San Ho, Emerald Hills, CA (US); Lijie Guan, Cupertino, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/990,468

(22) Filed: May 25, 2018

(51) Int. Cl.
*G11B 20/10* (2006.01)
*G11B 20/12* (2006.01)

(52) U.S. Cl.
CPC .............................. *G11B 20/1217* (2013.01)

(58) Field of Classification Search
CPC . G11B 33/144; G11B 5/756; G11B 20/10388; G11B 2005/0021; G11B 5/74; G11B 5/743; G11B 7/2407; G11B 5/82; G11B 7/2405; G11B 20/10268; G11B 20/12; G11B 20/10009; G11B 5/00; G11B 27/36; G11B 20/14; G11B 20/16; G11B 20/18

USPC ...... 360/29, 48, 77.08, 59, 313, 131, 25, 40, 360/31
See application file for complete search history.

(56) References Cited

U.S. PATENT DOCUMENTS

| | | | |
|---|---|---|---|
| 9,601,144 B1 | 3/2017 | Mehta et al. | |
| 9,601,145 B1 | 3/2017 | Grobis et al. | |
| 9,697,857 B1 | 7/2017 | Ahner et al. | |
| 9,818,440 B1* | 11/2017 | Jubert | G11B 5/314 |
| 9,858,950 B1 | 1/2018 | Bueck et al. | |
| 9,911,446 B1 | 3/2018 | Ahner et al. | |
| 2010/0149676 A1* | 6/2010 | Khizorev | G11B 5/02 360/55 |
| 2014/0247520 A1 | 9/2014 | Yang et al. | |

* cited by examiner

*Primary Examiner* — Nabil Z Hindi

(57) ABSTRACT

A data storage device is disclosed comprising a head actuated over a disk surface comprising a first magnetic recording layer and a second magnetic recording layer. Data is encoded into a codeword comprising a plurality of non-binary symbols wherein each symbol represents one of a plurality of symbol values comprising a first symbol value, a second symbol value, and a third symbol value. The first symbol value is written to the disk surface by magnetizing the first and second magnetic recording layers, and the second symbol value is written to the disk surface by magnetizing the first magnetic recording layer without substantially affecting the magnetization of the second magnetic recording layer. The encoding into the codeword codes out at least one sequence of symbol values to prevent an ambiguity between detecting the first symbol value and the second symbol value during a read operation.

20 Claims, 13 Drawing Sheets

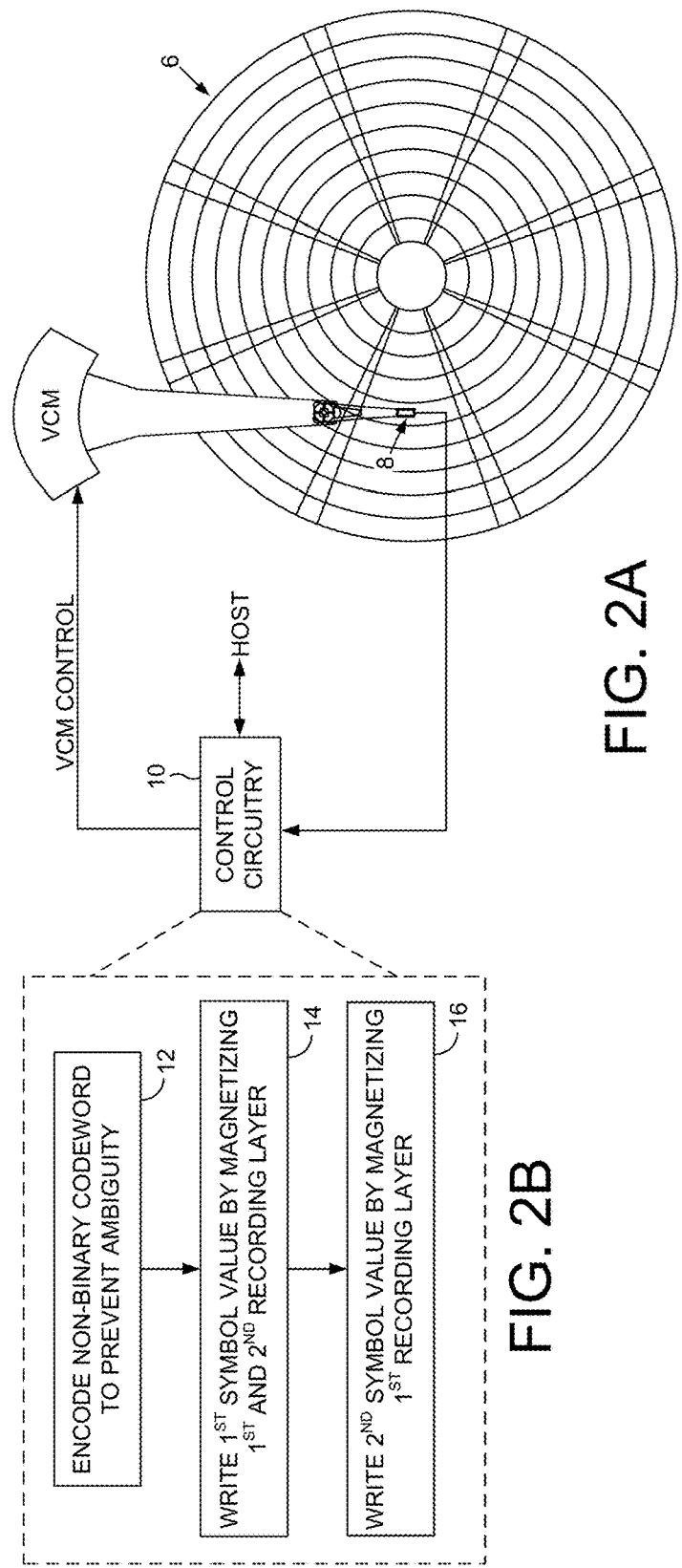

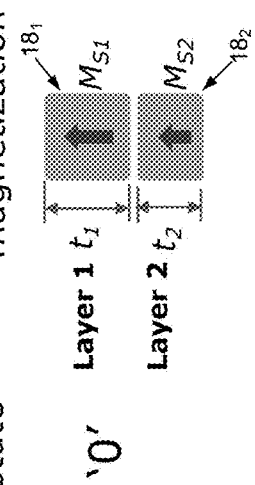
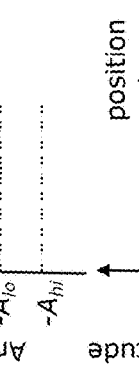
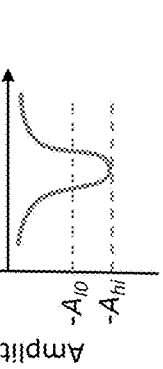
FIG. 3A  FIG. 3B  FIG. 3C  FIG. 3D

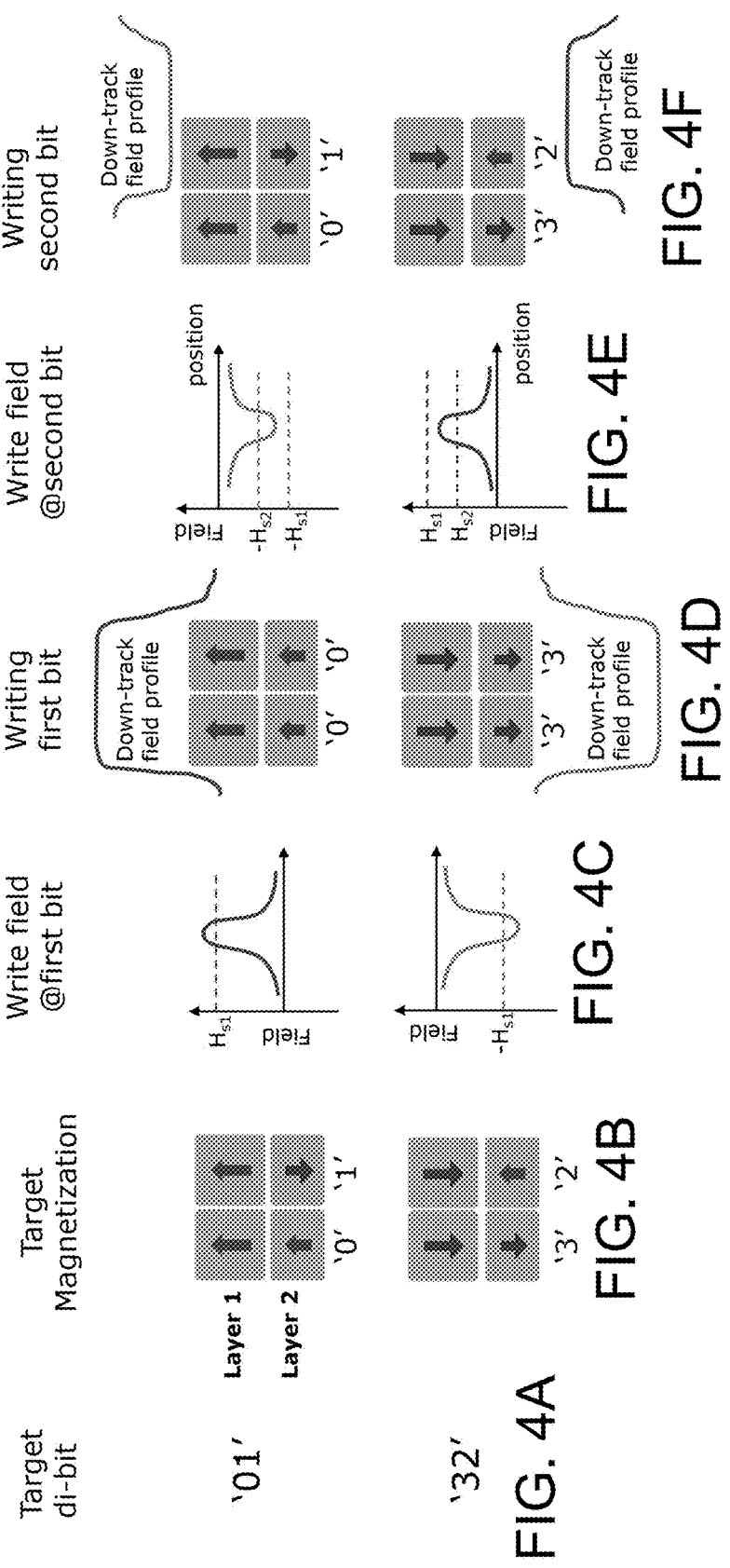

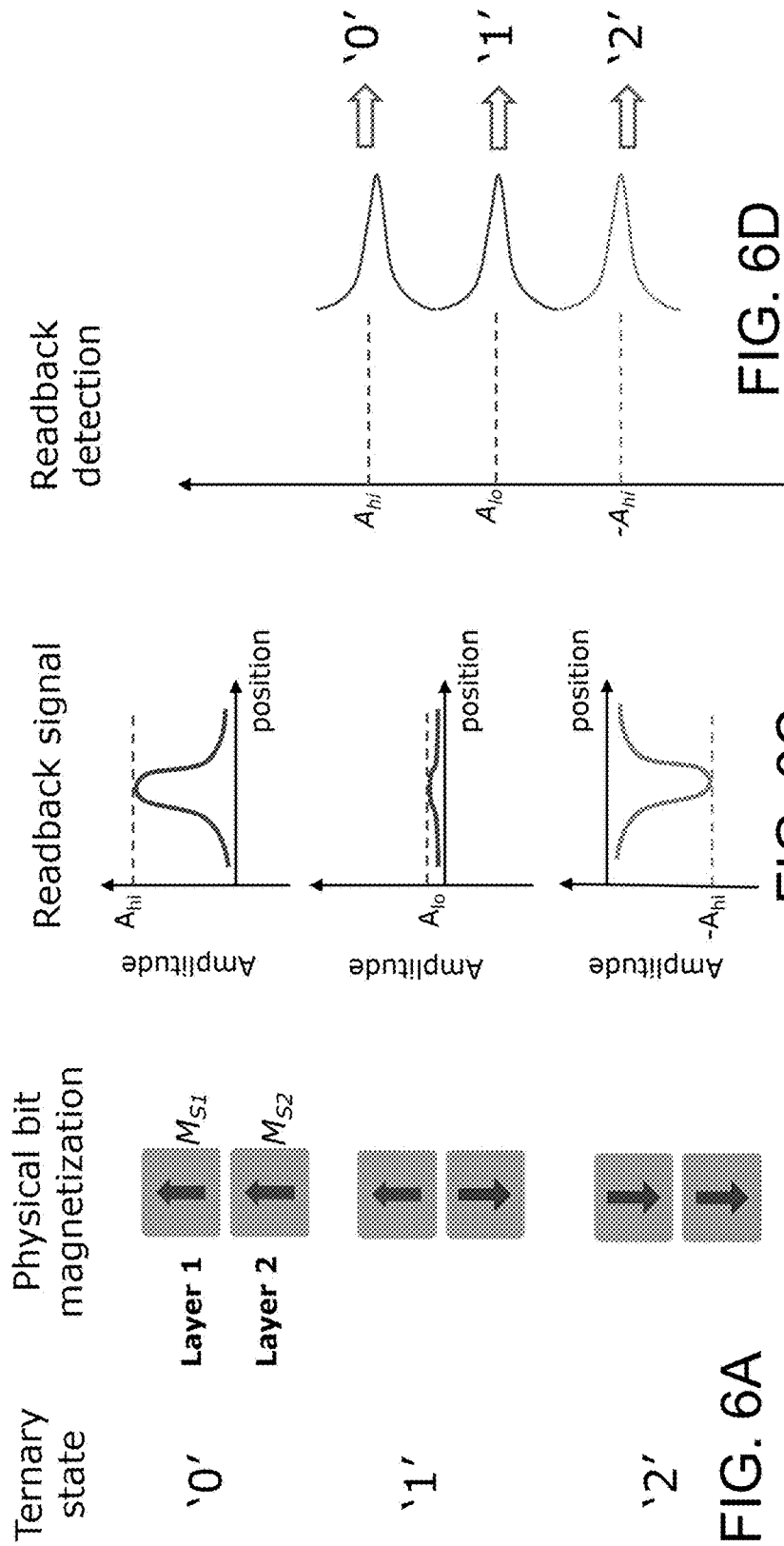

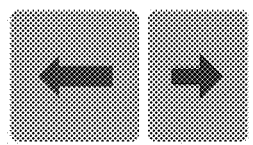
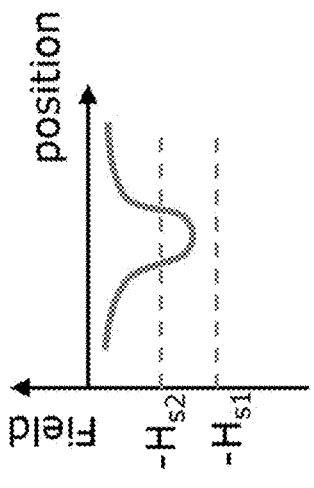
FIG. 7A  FIG. 7B  FIG. 7C

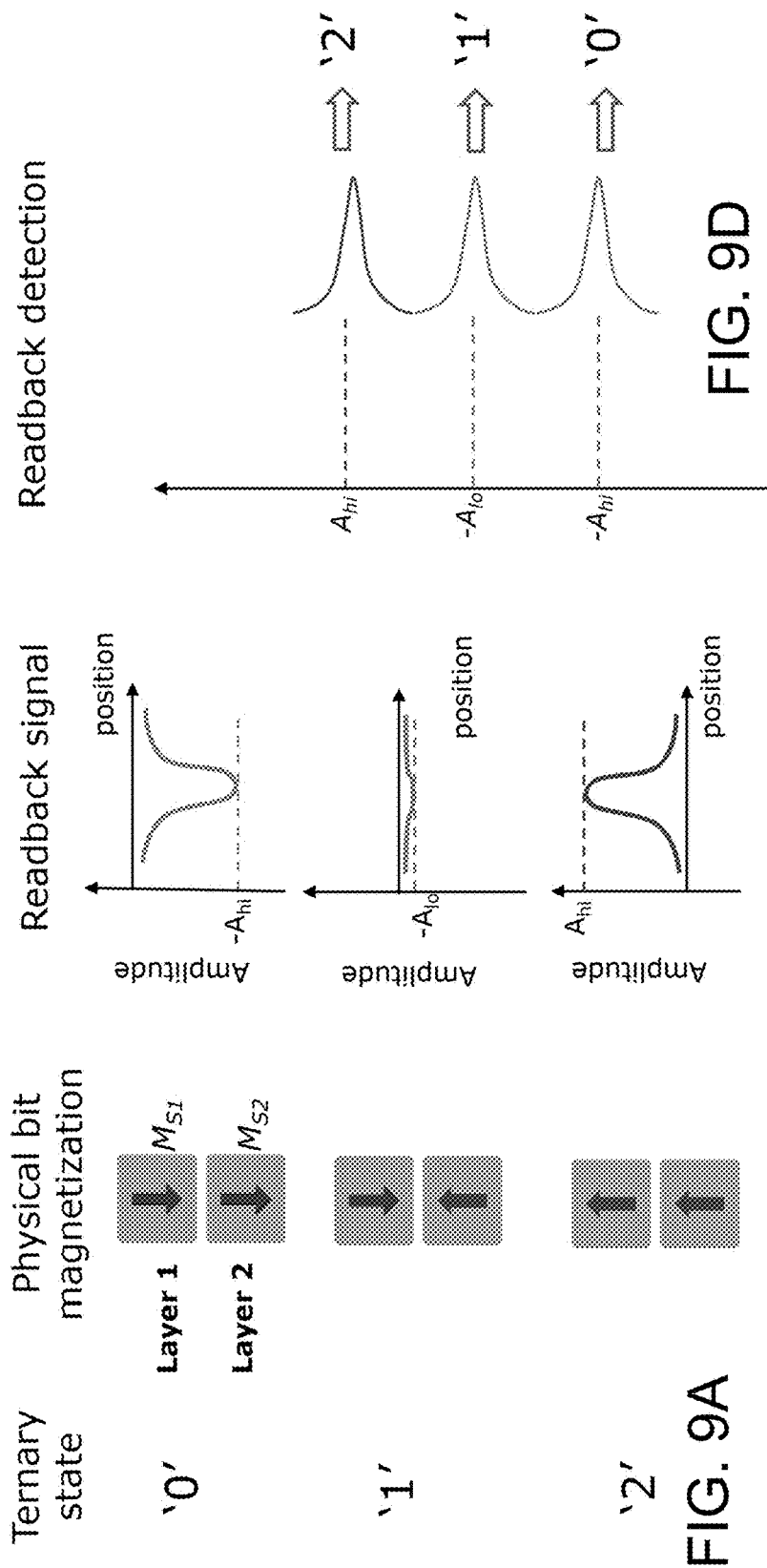

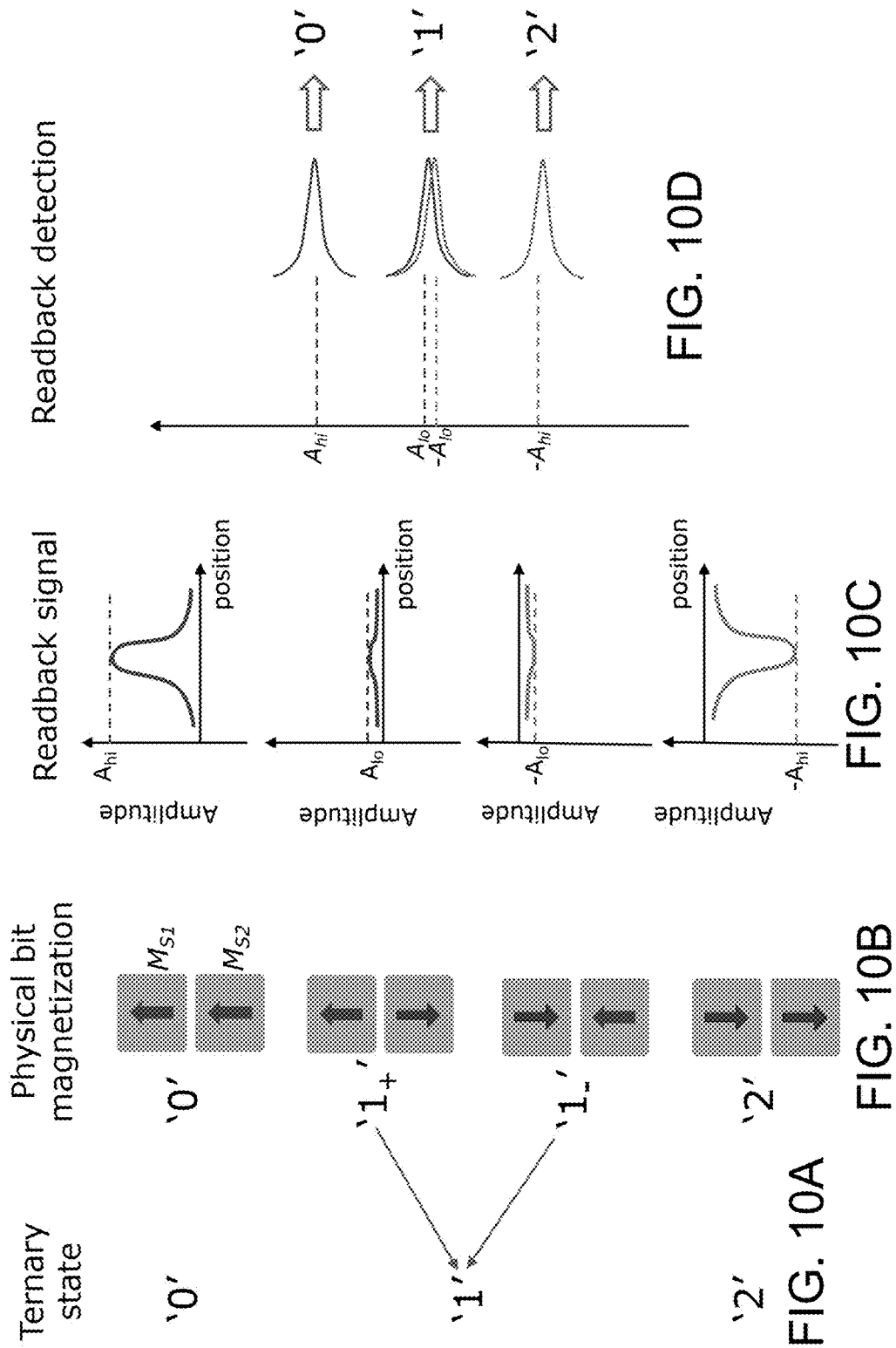

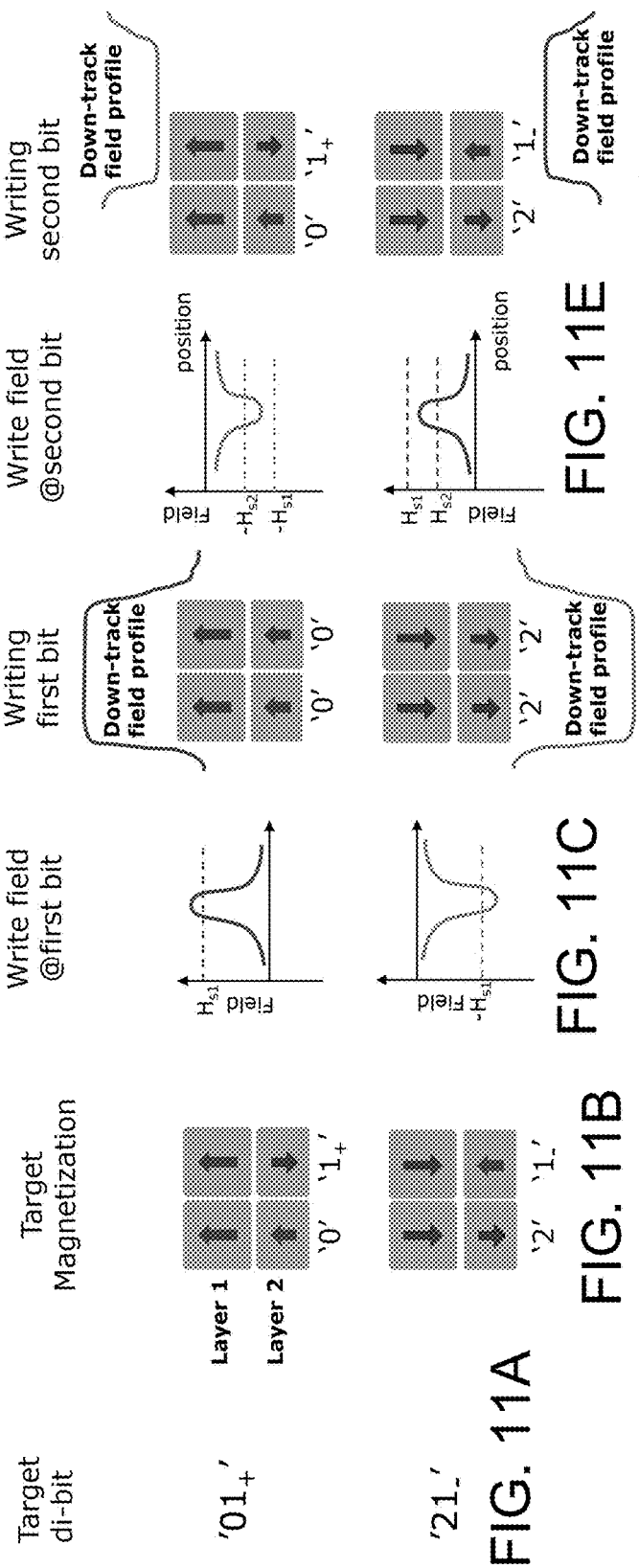

DATA STORAGE DEVICE CODING OUT AMBIGUITY IN THREE-DIMENSIONAL MAGNETIC RECORDING

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Conventional disk drives have employed a single magnetic recording layer wherein each symbol cell along the length of a data track is magnetized (e.g., longitudinally or perpendicularly) to record a single binary data bit. Three-dimensional magnetic recording (3DMR) is a recent development wherein multiple magnetic recording layers are fabricated on the disk surface each having a different saturation field level. An example of 3DMR is illustrated in FIG. 1 wherein a first magnetic recording layer $2_1$ (e.g., top layer) exhibits a first magnetization (M) versus magnetic field (H) or M-H hysteretic response $4_1$, and a second magnetic recording layer $2_2$ (e.g., bottom layer) exhibits a second M-H hysteretic response $4_2$. In this example, the saturation field level ($H_{S1}$) of the first magnetic recording layer $2_1$ is greater than the saturation field level ($H_{S2}$) of the second magnetic recording layer $2_2$, and therefore the first magnetic recording layer may be considered a "hard" layer and the second magnetic recording layer may be considered a "soft" layer. A non-binary symbol may then modulate the amplitude of the write current in order to write a non-binary symbol to each symbol cell along the length of a data track. During readback, the varying magnetization of each magnetic recording level results in a varying amplitude of the read signal that may be demodulated into the recorded non-binary symbol.

BRIEF DESCRIPTION OF THE DRAWINGS

FIG. 2A shows a data storage device in the form of a disk drive comprising a head actuated over a disk surface.

FIG. 2B is a flow diagram according to an embodiment wherein a non-binary codeword is encoded in order to code out at least one sequence of symbol values that would otherwise result in an ambiguity during readback.

FIGS. 3A-3D illustrate an embodiment of a 3DMR technique for recording a quaternary symbol value to a two layer recording medium.

FIGS. 4A-4F illustrate an embodiment for writing a "01" sequence of quaternary symbol values and a "32" sequence of quaternary symbol values.

FIGS. 6A-6D illustrate an embodiment of a 3DMR technique for recording a ternary symbol value to a two layer recording medium.

FIGS. 7A-7C illustrate an embodiment for writing a "1" ternary symbol value.

FIGS. 9A-9D illustrate an alternative embodiment of a 3DMR technique for recording a ternary symbol value to a two layer recording medium.

FIGS. 10A-10D illustrate yet another embodiment of a 3DMR technique for recording a ternary symbol value to a two layer recording medium.

FIGS. 11A-11F illustrate an embodiment for writing a "$01_+$" sequence of ternary symbol values and a "$21_-$" sequence of ternary symbol values.

DETAILED DESCRIPTION

Figure 1:
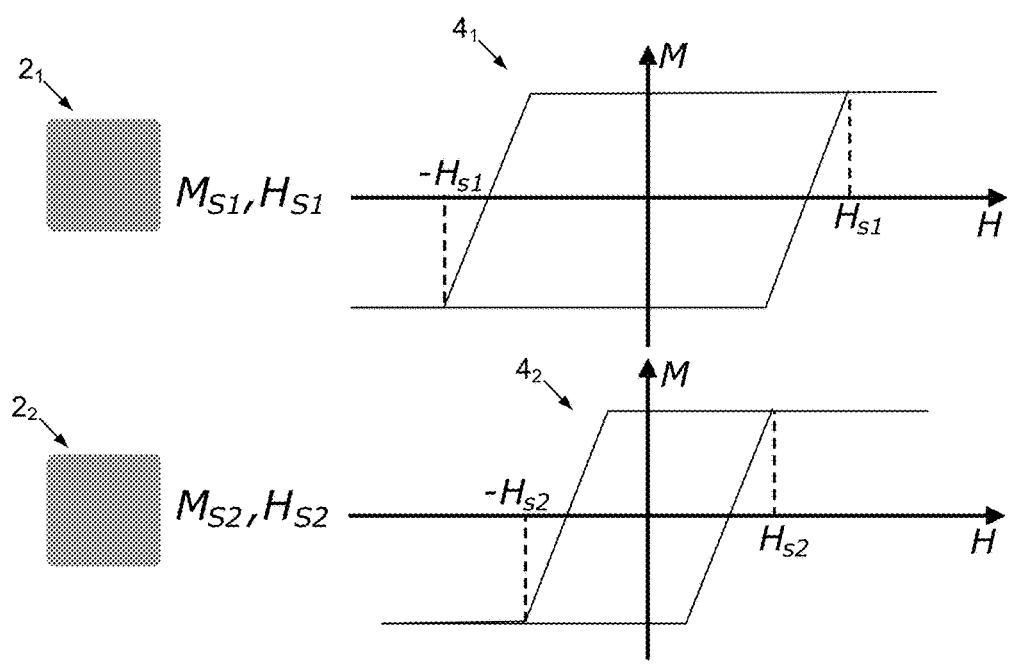
FIG. 1 shows an example of a prior art 3DMR medium comprising a first "hard" magnetic recording layer and a second "soft" magnetic recording layer.

FIG. 2A shows a data storage device in the form of a disk drive according to an embodiment comprising a disk surface 6 comprising a first magnetic recording layer and a second magnetic recording layer, and a head 8 actuated over the disk surface. The disk drive further comprises control circuitry 10 configured to execute the flow diagram of FIG. 2B, wherein data is encoded into a codeword comprising a plurality of non-binary symbols wherein each symbol represents one of a plurality of symbol values comprising a first symbol value, a second symbol value, and a third symbol value (block 12). The first symbol value is written to the disk surface by magnetizing the first and second magnetic recording layers (block 14), and the second symbol value is written to the disk surface by magnetizing the first magnetic recording layer without substantially affecting the magnetization of the second magnetic recording layer (block 16). The encoding into the codeword at block 12 codes out at least one sequence of symbol values to prevent an ambiguity between detecting the first symbol value and the second symbol value during a read operation.

FIGS. 3A-3D illustrate an embodiment of a 3DMR technique for recording a quaternary symbol value to a two layer recording medium. A top "hard" magnetic recording layer 181 having thickness t1 is fabricated over a bottom "soft" magnetic recording layer 182 having thickness t2. FIG. 3A shows four symbol values with a corresponding magnetic state of the top and bottom layer shown in FIG. 3B. FIG. 3C shows the respective amplitude of the read signal during readback of each symbol value, and FIG. 3D shows how the amplitude of the read signal may be demodulated into a corresponding detected symbol value.

FIGS. 4A-4F illustrate an embodiment for writing a "01" sequence of quaternary symbol values and a "32" sequence of quaternary symbol values. FIG. 4B shows the target magnetization of the top and bottom layers. In this embodiment, the magnetic field emanating from the write element spans multiple symbol cells along the length of a data track. FIG. 4C shows the amplitude of the write field when writing the first symbol of the two symbol sequence and FIG. 4D shows the magnetic state of the top and bottom layers after writing the first symbol. FIG. 4E shows the amplitude of the write field when writing the second symbol of the two symbol sequence and FIG. 4F shows the magnetic state of the top and bottom layers after writing the second symbol. FIGS. 4D and 4F also illustrate how it is not possible to write a "02" symbol sequence in this embodiment since the amplitude of the write field when writing the second "2" symbol will not flip the magnetic state of the top layer and therefore the second "2" symbol is effectively unwritten. Instead of detecting a "02" symbol sequence the second symbol would be detected as a "0" symbol value since the magnetic orientation of both the top and bottom layer would be pointing up. A similar ambiguity results when attempting to record a "31" symbol sequence. When writing a "11" symbol sequence, another ambiguity arises due to the magnetic state of the top layer being undefined since it is effectively unwritten when writing the first "1" symbol of the two symbol sequence. That is, the amplitude of the write field when writing the first "1" symbol will not affect the magnetic state of the top layer. A similar ambiguity arises when writing the symbol sequences "12", "21", and "22".

Figures 5A, 5B:
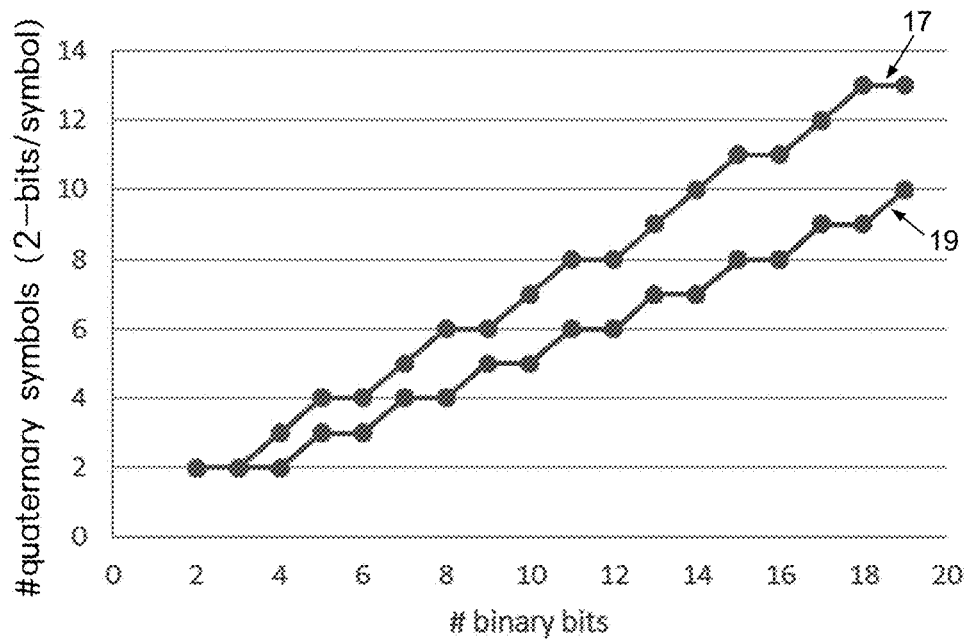
FIG. 5A illustrates an embodiment wherein sequences of quaternary symbol values are coded out of a codeword in order to avoid ambiguity during readback due to an unwritten magnetic state of a symbol cell in the hard magnetic recording layer.
FIG. 5B is a chart showing the number of bits of a binary codeword and corresponding number of symbols in a quaternary codeword without coding out the ambiguous symbol sequences and with coding out the ambiguous symbol sequences.
Figure 5C:
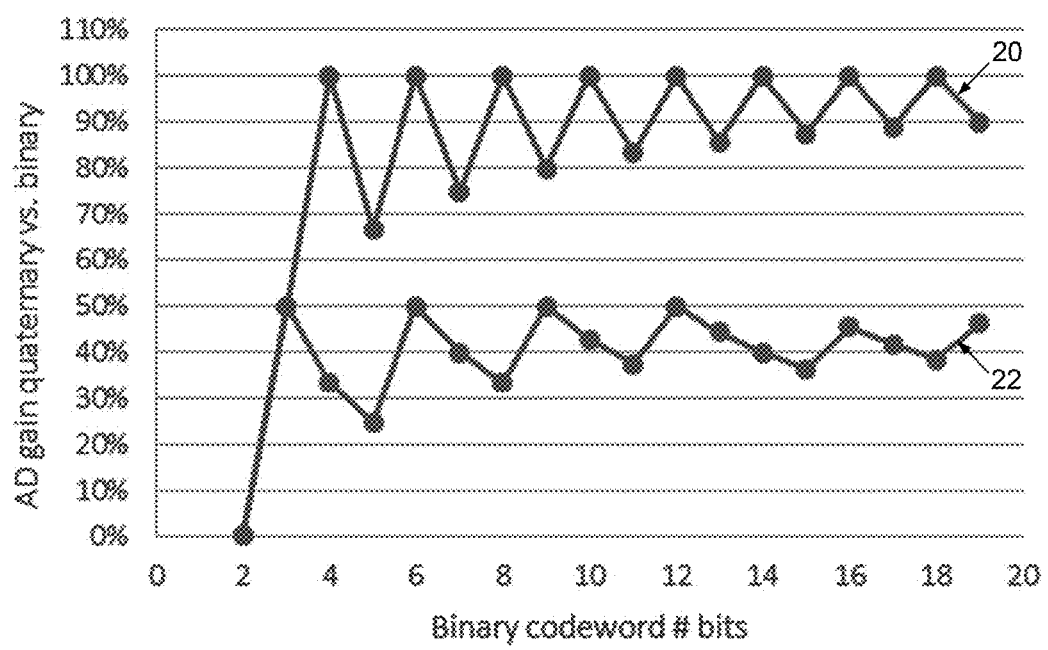
FIG. 5C illustrates the gain in areal density (AD) when recoding quaternary symbols (with and without the coding constraint) as compared to recording a conventional binary codeword.

In one embodiment, the data written to the disk is first encoded so as to code out the sequences of symbol values that would otherwise result in ambiguities during readback. FIG. 5A shows a table according to the quaternary symbol value embodiment of FIGS. 3A-3D showing the two symbol sequences that cause ambiguity during readback. In one embodiment, the data written to the disk is first encoded into codewords that lack the ambiguity symbol sequences shown in FIG. 5A. Any suitable technique may be employed to encode the codewords in order to code out the ambiguity symbol sequences, wherein in one embodiment a "brute force" technique may be employed. With "brute force" encoding, a number of k-bit datawords are arbitrarily mapped to a number of n-bit codewords thereby achieving a code rate of k/n. For example, encoding 4-bit datawords (16 two symbol datawords) requires 6-bit codewords (64 two symbol codewords) so that the codewords comprising the ambiguity sequences shown in FIG. 5A may be discarded while still having enough codewords to encode the sixteen datawords. FIG. 5B is a graph showing the number of bits of a binary codeword and corresponding number of symbols in a quaternary codeword without coding out the ambiguous symbol sequences (curve 17) and with coding out the ambiguous symbol sequences (curve 19). FIG. 5C is a graph of the areal density gain of quaternary codewords over binary codewords without coding out the ambiguous symbol sequences (curve 20) and with coding out the ambiguous symbol sequences (curve 22).

Figures 8A, 8B:
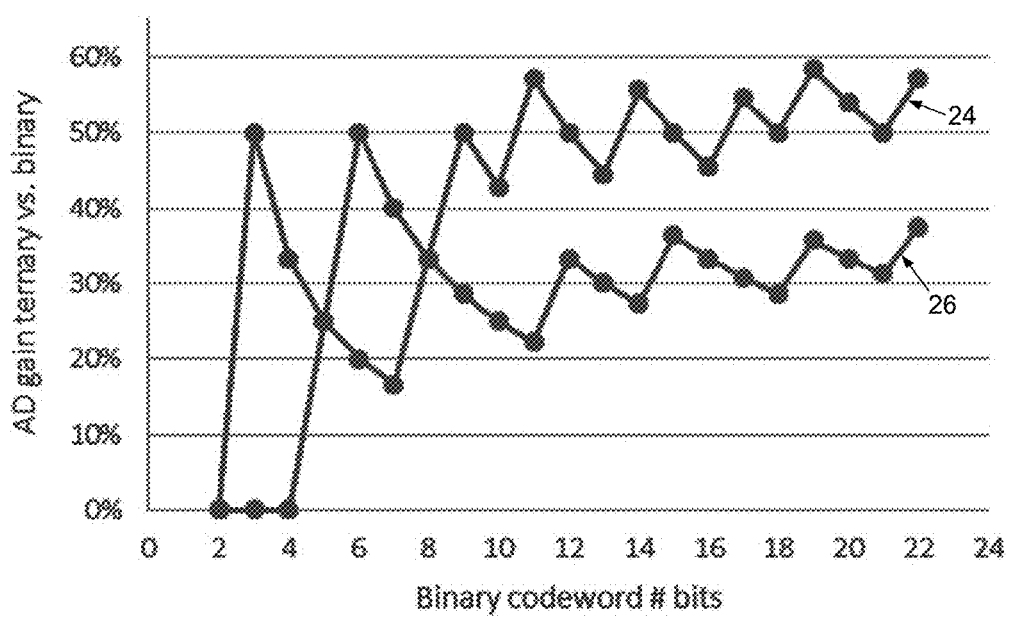
FIG. 8A illustrates an embodiment wherein a "21" sequence of ternary symbol values are coded out of a codeword in order to avoid ambiguity during readback due to an unwritten magnetic state of a symbol cell in the hard magnetic recording layer.
FIG. 8B illustrates the gain in areal density (AD) when recoding ternary symbols (with and without the coding constraint) as compared to recording a conventional binary codeword.

FIGS. 6A-6D illustrate an embodiment of a 3DMR technique for recording a ternary symbol value to a two layer recording medium (top "hard" layer and bottom "soft" layer). FIG. 6A shows three symbol values with a corresponding magnetic state of the top and bottom layer shown in FIG. 6B. FIG. 6C shows the respective amplitude of the read signal during readback of each symbol value, and FIG. 6D shows how the amplitude of the read signal may be demodulated into a corresponding detected symbol value. In this embodiment, the top "hard" layer and the bottom "soft" layer are fabricated such that when writing/reading a "1" symbol value from the disk the magnetic moments of the top and bottom layers substantially cancel one another resulting in a read signal amplitude near zero as shown in FIG. 6C. Also in this embodiment, before writing data to the disk both magnetic recording layers are first initialized to the "up" magnetic state (DC erased) by applying a write field that exceeds the saturation field level of both layers. FIGS. 7A-7C illustrate an embodiment for writing a "1" symbol value by applying a write field that is greater than the saturation field level of the bottom "soft" layer but below the saturation field level of the top "hard" layer. In this embodiment, an ambiguity arises when writing the "21" symbol sequence and the write field spans two symbol cells as described above. Writing the first "2" symbol will magnetize both symbol cells in the "down" magnetic state, and writing the "1" symbol will not change the top layer of the second symbol cell to the "up" magnetic state (such that the "1" symbol value will be demodulated erroneously into the "2" symbol value). Accordingly in one embodiment shown in FIG. 8A, when writing data to the disk datawords are encoded into codewords so as to code out the "21" symbol sequence thereby avoiding the ambiguity during readback. FIG. 8B is a graph of the areal density gain of ternary codewords over binary codewords without coding out the ambiguous "21" symbol sequence (curve 24) and with coding out the ambiguous "21" symbol sequences (curve 26).

FIGS. 9A-9D illustrate an alternative embodiment of a 3DMR technique for recording a ternary symbol value to a two layer recording medium. In this embodiment, before writing data to the disk both magnetic recording layers are first initialized to the "down" magnetic state (DC erased) by applying a write field that exceeds the field saturation level of both layers. In this embodiment, a similar ambiguity arises when writing the "21" symbol sequence and the write field spans two symbol cells as described above. Writing the first "2" symbol will magnetize both symbol cells in the "up" magnetic state, and writing the "1" symbol will not change the top layer of the second symbol cell to the "down" magnetic state (such that the "1" symbol value will be demodulated erroneously into the "2" symbol value). In this embodiment, the "21" symbol sequence is coded out when encoding the datawords into the codewords written to the disk as described above.

Figures 12A, 12B:
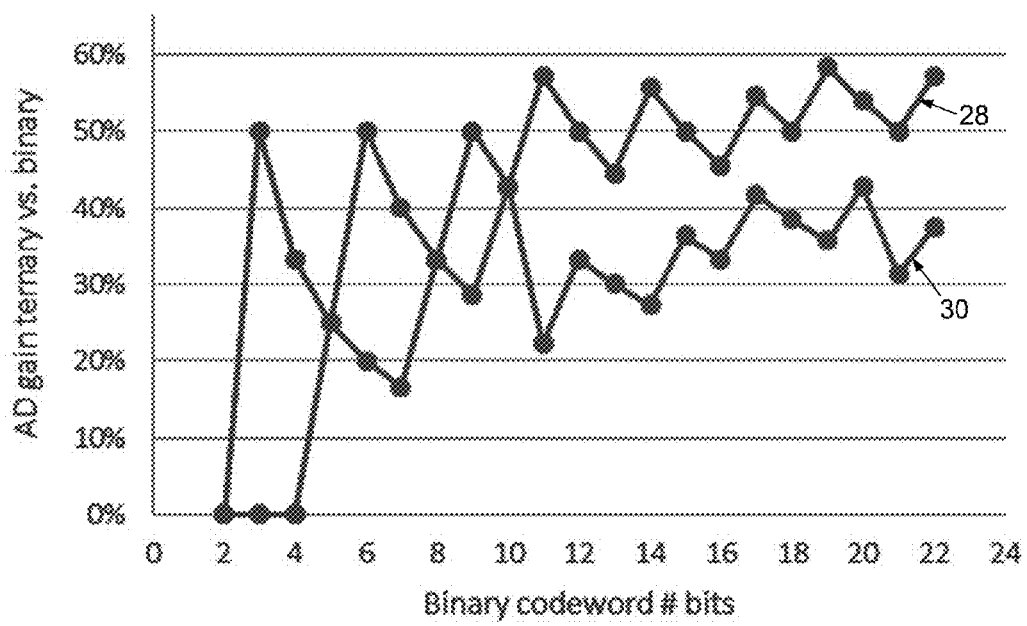
FIG. 12A illustrates an embodiment wherein sequences of ternary symbol values are coded out of a codeword in order to avoid ambiguity during readback due to an unwritten magnetic state of a symbol cell in the hard magnetic recording layer.
FIG. 12B illustrates the gain in areal density (AD) when recoding ternary symbols (with and without the coding constraint) as compared to recording a conventional binary codeword.

FIGS. 10A-10D illustrate yet another embodiment of a 3DMR technique for recording a ternary symbol value to a two layer recording medium. FIG. 10A shows three symbol values with a corresponding magnetic state of the top and bottom layer shown in FIG. 10B. FIG. 10C shows the respective amplitude of the read signal during readback of each symbol value, and FIG. 10D shows how the amplitude of the read signal may be demodulated into a corresponding detected symbol value. In this embodiment, the magnetic state of the top and bottom layers are not initialized (not DC erased) before writing data to the disk. Also in this embodiment, when writing a "1" symbol value the magnetic state of the bottom "soft" magnetic layer is written with a different polarity: down polarity when writing a "01" symbol sequence and up when writing the "21" symbol sequence. The different polarity when writing a "1" symbol value is represented as writing the "1$_+$" symbol value when writing the "01" symbol sequence and writing a "1$_-$" symbol value when writing a "21" symbol sequence. FIGS. 11A-11F further illustrate writing the "01$_+$" and "21$_-$" symbol sequence when the write field spans at least two symbol cells. In this embodiment because the magnetic layers are not initialized (DC erased) before writing data to the disk, there is an ambiguity when writing two consecutive "1" symbol values since the top "hard" magnetic layer is undefined (unwritten). Accordingly in this embodiment, the write data is encoded so as to code out all "11" symbol sequences as illustrated in FIG. 12A. FIG. 12B is a graph of the areal density gain of ternary codewords over binary codewords without coding out the ambiguous "11" symbol sequence (curve 28) and with coding out the ambiguous "11" symbol sequences (curve 30).

In the embodiments described above, the top magnetic recording layer is fabricated with a higher saturation field level than the bottom magnetic recording layer such that the top layer is considered the "hard" layer and the bottom layer is considered the "soft" layer. In other embodiments, the top magnetic recording layer may be fabricated with a lower saturation field level than the bottom magnetic recording layer such that the bottom layer may be considered the "hard" layer and the top layer may be considered the "soft" layer.

Any suitable technique may be employed to achieve a different saturation field level and/or magnetic moments of each magnetic recording layer, including to fabricate each layer with different materials, different thicknesses, etc., and/or by controlling the spacing of the magnetic recording layers relative to the write field. For example, in one embodiment the effective saturation field level of the bottom magnetic recording layer may be considered "hard" due to being further away from the write element during a write operation. In yet another embodiment, the disk may be fabricated with an insulating layer between the first and second recording layers so that the top and bottom recording layers are magnetically exchange decoupled which may increase the effective saturation field level of the bottom magnetic recording layer.

Although the above described embodiments employ two magnetic recording layers, those skilled in the art understand that similar techniques may be applied to a disk fabricated with more than two magnetic recording layers using similar encoding techniques.

Any suitable control circuitry may be employed to implement the flow diagrams in the above embodiments, such as any suitable integrated circuit or circuits. For example, the control circuitry may be implemented in a power integrated circuit, or in a component separate from the power integrated circuit, such as a disk controller, or certain operations described above may be performed by a power integrated circuit and others by a disk controller. In one embodiment, the power integrated circuit and disk controller are implemented as separate integrated circuits, and in an alternative embodiment they are fabricated into a single integrated circuit or system on a chip (SOC). In addition, the control circuitry may include a suitable preamp circuit and a read channel circuit implemented as separate integrated circuits, integrated into the or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:
1. A data storage device comprising:
 a disk surface comprising a first magnetic recording layer and a second magnetic recording layer;
 a head actuated over the disk surface; and
 control circuitry configured to:
  encode data into a codeword comprising a plurality of non-binary symbols wherein each symbol represents one of a plurality of symbol values comprising a first symbol value, a second symbol value, and a third symbol value;

write the first symbol value to the disk surface by magnetizing the first and second magnetic recording layers; and write the second symbol value to the disk surface by magnetizing the first magnetic recording layer without substantially affecting the magnetization of the second magnetic recording layer, wherein:

the encoding into the codeword codes out at least one sequence of symbol values to prevent an ambiguity between detecting the first symbol value and the second symbol value during a read operation; and the ambiguity arises from an unwritten magnetic state of a symbol cell in the second magnetic recording layer.

2. The data storage device as recited in claim 1, wherein the plurality of symbol values comprises a fourth symbol value, and the control circuitry is further configured to:

write the third symbol value to the disk surface by magnetizing the first magnetic recording layer without substantially affecting the magnetization of the second magnetic recording layer; and write the fourth symbol value to the disk surface by magnetizing the first and second magnetic recording layers.

3. The data storage device as recited in claim 2, wherein the encoding codes out a sequence consisting of the third symbol value following the first symbol value.

4. The data storage device as recited in claim 2, wherein the encoding codes out a sequence consisting of two consecutive second symbol values.

5. The data storage device as recited in claim 1, wherein the control circuitry is further configured to:

DC erase an area of the disk surface; and write the symbols of the codeword to the DC erased area of the disk surface.

6. The data storage device as recited in claim 5, wherein the encoding codes out sequences comprising the second symbol value following the third symbol value.

7. The data storage device as recited in claim 1, wherein the control circuitry is further configured to:

write the second symbol value to the disk surface by magnetizing the first magnetic recording layer according to a first magnetic polarity when writing the second symbol value following the writing of the first symbol value; and write the second symbol value to the disk surface by magnetizing the first magnetic recording layer according to a second magnetic polarity opposite the first magnetic polarity when writing the second symbol value following the writing of the third symbol value.

8. The data storage device as recited in claim 7, wherein the encoding codes out a sequence consisting of two consecutive second symbol values.

9. The data storage device as recited in claim 1, wherein the control circuitry is further configured to magnetize two consecutive symbol cells of the first and second magnetic recording layers when writing the first symbol value to the disk surface.

10. The data storage device as recited in claim 1, wherein a saturation field level of the first magnetic recording layer is less than a saturation field level of the second magnetic recording layer.

11. A method of operating a data storage device, the method comprising:

encoding data into a codeword comprising a plurality of non-binary symbols each representing a symbol value; and reading the non-binary symbols recorded on a disk surface comprising multiple magnetic recording layers;

wherein:

the encoding into the codeword codes out at least one sequence of symbol values to prevent an ambiguity between detecting a first symbol value and a second symbol value; and the ambiguity arises from an unwritten magnetic state of a symbol cell in one of the magnetic recording layers.

12. The method as recited in claim 11, further comprising:

writing a third symbol value to the disk surface by magnetizing a first magnetic recording layer without substantially affecting the magnetization of a second magnetic recording layer; and writing a fourth symbol value to the disk surface by magnetizing the first and second magnetic recording layers.

13. The method as recited in claim 12, wherein the encoding codes out a sequence consisting of the third symbol value following the first symbol value.

14. The method as recited in claim 12, wherein the encoding codes out a sequence consisting of two consecutive second symbol values.

15. The method as recited in claim 11, further comprising:

DC erasing an area of the disk surface; and writing the symbols of the codeword to the DC erased area of the disk surface.

16. The method as recited in claim 15, wherein the encoding codes out sequences comprising a second symbol value following a third symbol value.

17. The method as recited in claim 15, further comprising:

writing a second symbol value to the disk surface by magnetizing a first magnetic recording layer according to a first magnetic polarity when writing a second symbol value following the writing of a first symbol value; and writing the second symbol value to the disk surface by magnetizing the first magnetic recording layer according to a second magnetic polarity opposite the first magnetic polarity when writing the second symbol value following the writing of a third symbol value.

18. The method as recited in claim 17, wherein the encoding codes out a sequence consisting of two consecutive second symbol values.

19. The method as recited in claim 11, further comprising magnetizing two consecutive symbol cells of the first and second magnetic recording layers when writing the first symbol value to the disk surface.

20. The method as recited in claim 11, wherein a saturation field level of the first magnetic recording layer is less than a saturation field level of the second magnetic recording layer.

* * * * *